United States Patent
Kasten

[15] 3,680,659
[45] Aug. 1, 1972

[54] NOISE MUFFLER HAVING A UNIQUE PRESSURE SAFETY VALVE

[72] Inventor: Walter Kasten, Franklin, Mich.
[73] Assignee: The Bendix Corporation
[22] Filed: Aug. 23, 1971
[21] Appl. No.: 173,756

[52] U.S. Cl..................181/36 A, 181/37, 181/55, 181/60
[51] Int. Cl............F01n 1/10, F01n 3/02, F01n 7/00
[58] Field of Search......181/35 R, 35 A, 36 R, 36 A, 181/37, 42, 50, 60; 55/276

[56] References Cited

UNITED STATES PATENTS

| | | |
|---|---|---|
| 291,762 | 1/1884 | Nason...........................181/60 |
| 2,222,703 | 11/1940 | Bixler..........................181/37 |
| 2,600,236 | 6/1952 | Gibel...........................181/60 |
| 2,815,088 | 12/1957 | Gibel.........................181/36 A |
| 3,293,830 | 12/1966 | McKinley....................181/35 A |
| 3,339,668 | 9/1967 | Trainor........................181/37 |
| 3,380,553 | 4/1968 | Gibel...........................181/60 |
| 3,561,561 | 2/1971 | Trainor........................181/55 |

FOREIGN PATENTS OR APPLICATIONS 1,269,772  7/1961  France..........................181/60

Primary Examiner—Robert S. Ward, Jr.
Attorney—John S. Bell

[57] ABSTRACT

A muffler for reducing the noise level of a noise carrying gaseous flow having a fiberglass depth type filter and a pleated paper filter mounted within a metallic canister. The depth type filter has a sufficient thickness and density to break up an acoustic wave and thereby reduce the noise level accompanying a gas flow through the filter to a predetermined level. A groove is formed in one solid portion of the metallic housing. Gas flow introduced into the housing can reach this housing portion without passing through the filter. The groove weakens this portion of the housing so that it will rupture along the groove in response to too great a gaseous pressure. The groove has a half-circle shape so that the housing portions on opposite sides of the groove will only be bent during rupture. No part of the housing will be broken off during rupture and become a dangerous projectile.

3 Claims, 3 Drawing Figures

PATENTED AUG 1 1972

3,680,659

INVENTOR
WALTER KASTEN
BY
John L. Bell
ATTORNEY

NOISE MUFFLER HAVING A UNIQUE PRESSURE SAFETY VALVE

FIELD OF THE INVENTION

Noise mufflers.

BACKGROUND OF THE INVENTION

Compressed air is used in many machines and other manufacturing applications. For example, it is used to drive air compressors and air hammers, to open and close molds in foundrys, to activate clamping fixtures, to operate piston pumps, and for any number of other applications. Exhaust air is discharged from these and similar machines at high velocities so that the discharge generates objectional noise that can cause ear damage as well as operator fatigue. In recognition of the harmful effects of high noise levels Federal noise level exposure standards have been developed by the Department of Labor and incorporated into the health and safety regulations of the Walsh-Healey Act. These standards require that an operator not be exposed to particular average noise levels for more than certain stated times. For example, an operator cannot be exposed to an average noise level of 95 decibels for more than four hours a day, and cannot be exposed to an average noise level of 105 decibels for more than 1 hour in a day. Many industrial machines operate at an unacceptably high noise level. For example, air hammers and vacuum pumps operate at noise levels of 107 and 108 decibels, respectively. An air hammer on a steel tank operates at an average noise level of 121 decibels. By comparison, a jet airliner flying only 500 feet overhead creates only a 115 decibel average noise level.

In addition to the undesirable high noise level of industrial machines utilizing compressed air, lubricating oil in liquid or mist form is usually added to the air supplied to those machines in order to prevent scruffing or sizing of the moving parts. This oil is emitted with the exhaust air in the form of a highly dispersed mist. This oil mist not only coats lighting fixtures, windows, safety glasses, and other material to cause a high maintenance expense, but also may cause certain respiratory diseases.

SUMMARY OF THE INVENTION

This invention comprises a low-cost noise muffler that can be attached to an outlet or exhaust port of an air operated machine, and that will reduce the noise level of the exhaust discharge to an acceptable low level. The noise filter of this invention also removes contaminants from the noise carrying air discharge.

The subject invention includes a porous material having sufficient thickness and density to break up an acoustic wave and reduce the noise level of a gaseous discharge to a predetermined low level. The porous material is mounted in a housing having a perforated portion providing an outlet flow path from the muffler and a solid portion impervious to gaseous flow. The porous material is mounted in substantially air tight contact with the solid portion of the housing so that all gaseous flow received by the muffler must pass through the porous material to reach the perforated housing portion and be expelled from the muffler.

A groove is formed on one area of the solid portion of the housing. Gas flow introduced into the housing can reach this solid portion without passing through the porous material. This groove weakens the housing so that it will rupture along the groove in response to too great a pressure. The groove does not define a closed path, but instead has a beginning and an end displaced a sufficient distance from the beginning so that the housing portions on opposite sides of the groove will be bent during rupture. But, no part of the housing will be broken off during a rupture and become a dangerous projectile. This groove formed in a solid portion of the housing of the muffler thus comprises a safety pressure valve that is substantially safer than a valve such as a pop-off rubber disc or plug that is broken completely free from the housing and becomes a dangerous projectile when pressure within the housing reaches a predetermined level. The groove safety valve of this invention is substantially cheaper and easier to construct than is a spring operated pressure relief valve.

The porous noise reducing material, which comprises a fiberglass depth type filter in the embodiment illustrated herein, also coalesces vapor contaminants, such as oil vapors in the gaseous flow, and removes those vapors from the flow. In the embodiment illustrated herein, a pleated paper filter is disposed upstream from the depth type filter to remove solid particle contaminants from the flow. The removed contaminants are held by the pleated paper and the depth type filters. These contaminants reduce the porosity of the filters to air flow. When they become clogged so that pressure reaches a predetermined level within the muffler, the groove safety valve ruptures indicating that the muffler needs to be replaced.

BRIEF DESCRIPTION OF THE DRAWINGS

Further objects, features, and advantages of this invention, which is defined by the appended claims, will become apparent from a consideration of the following description and the accompanying drawings in which:

DETAILED DESCRIPTION OF THE PREFERRED EMBODIMENT

Figure 1:
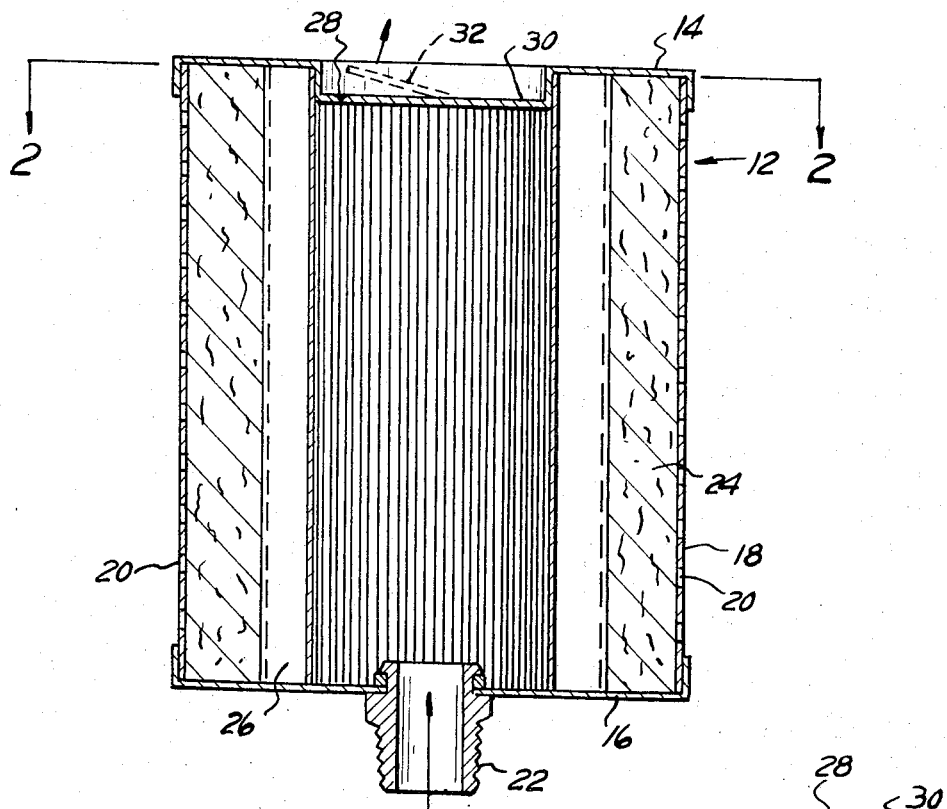
FIG. 1 is a schematic, cut-away, two-dimensional plan view of one embodiment of the noise muffler of this invention.

FIG. 1 illustrates a noise muffler 10 comprising a metallic canister housing 12 having solid end plates 14 and 16 which are impervious to gas flow. Housing 12 also includes a cylindrical side wall 18 having perforations 20 which form outlet ports for air flow from the muffler 10. A hollow fitting 22 is attached to the end wall 16. Fitting 22 is adapted to be attached to an air outlet or exhaust port of a machine to provide a substantially airtight or leakproof flow line from the machine exhaust port to the inside of muffler 10. A cylinder 24 of material that is porous to air flow, namely, a fiberglass bat or filter, is disposed inside housing 12. The fiberglass material forming cylinder 24 has a sufficient thickness and density to break up an acoustic wave and reduce the noise level accompanying gaseous flow introduced into muffler 10 to a predetermined, acceptable low level. The opposite ends of cylinder 24 are glued to the solid end caps 14 and 16 around the entire circumference of the cylinder so that substantially all air introduced into the muffler 10 must pass through the porous fiberglass material. A cylindrical pleated paper filter 26 for removing solid particles is disposed inside of, or in other words upstream from, the porous fiberglass cylinder 24.

Figure 3:
FIG. 3 is a cut-away two-dimensional view from the position defined by line 3—3 of the portion of the housing of the muffler of FIGS. 1 and 2 having a rupture groove formed therein.
Figure 2:
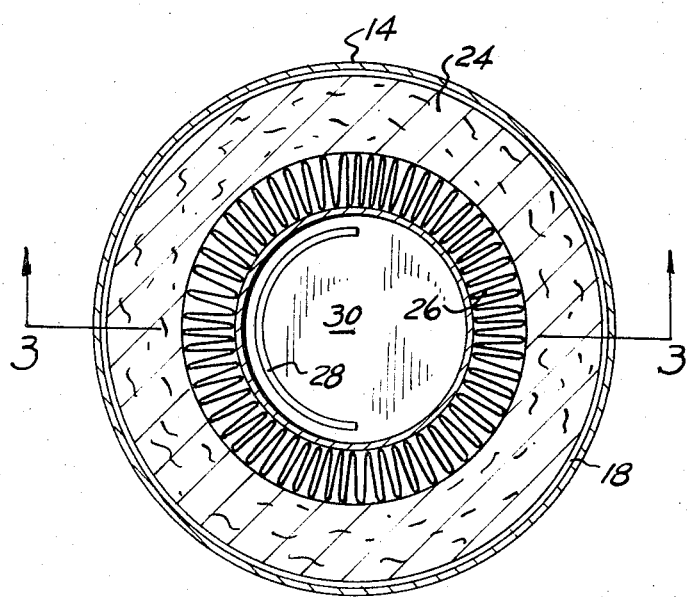
FIG. 2 is a two-dimensional, plan view of the noise muffler of FIG. 1 cut-away and illustrated along line 2—2.

As is seen in FIGS. 2 and 3, as well as FIG. 1, noise muffler 10 includes a groove 28 formed in depressed portion 30 of solid end cap 14. Depressed portion 30 fits inside of pleated paper filter 26, and air introduced into muffler 10 can reach that portion without passing through any filter element. Groove 28 weakens portion 30 of end cap 13 so that it ruptures along groove 28 in response to too great a pressure being developed inside muffler 10. Groove 28 does not define a complete closed path, but instead is a semi-circle having opposite ends displaced from each other a sufficient distance so that the portions of end caps 14 on opposite sides of groove 28 will merely be bent with respect to each other during a rupture. That is, the portion of end cap 14 partially encircled by groove 28 is merely bent to occupy positions 32 shown in FIG. 1 during a rupture. No part of the housing 12 will be broken off and propelled to become a dangerous projectile.

The precise dimensions for any particular embodiment of noise muffler 10 may be determined experimentally. Porous cylinder 24 must have a density sufficient to reduce the noise level of a gaseous flow to an acceptable value. A more dense material provides a greater noise reduction than does a less dense material. However, cylinder 24 cannot present too great an obstruction to air flow or it will slow the operation of the machine to which it is attached. That is, air is exhausted from compressors and similar machines in order to enable a particular part to be moved during operation. The rate at which air is exhausted from the machine determines the rate at which the machine operates. The obstruction to air flow provided by a muffler, such as muffler 10, is decreased as the density of cylinder 24 is decreased. And, the obstruction of such a muffler is decreased as the cross-sectional inner surface area of cylinder 24 is increased. In addition, the groove 28 must be formed to a depth such that the filter will rupture at a pressure approximately equal to a predetermined pressure.

One embodiment that has been found useful for many applications comprises a cylindrical muffler similar to that shown having a length of about 8 inches. The porous material 24 is formed from a fiberglass bat having a density of about 0.045 lbs./cu. ft., having a thickness of about one-half inch, and having an inner diameter of about 2-½ inches. In this embodiment, the housing 12 is formed from 0.025 stock steel plate, and groove 28 is cut to a depth of 0.020 inches. A rupture occurs at a pressure between 40 and 60 lbs./sq. in.

In operation, fitting 22 is attached to a gaseous exhaust port and a gas flow is introduced into the muffler 10. This gas flow passes through porous filters 24 and 26 which break up the acoustic wave traveling with that gas flow and reduce the noise level associated with that flow. Filter 26 removes solid particle contaminants from the gaseous flow. Fiberglass filter 24 coalesces and removes liquid vapor contaminants such as oil vapors in any gaseous flow passing through that element. The muffler 10, therefore, operates as an effective filter which removes both solid and liquid contaminants from a gaseous flow and prevents those contaminants from being vented to air where they may cause harm. The contaminants removed by filters 24 and 26 are held by those filters so that the filters ultimately become clogged. The clogging of filters 24 and 26 causes the pressure within muffler 10 to increase. Muffler 10 is designed so that a rupture occurs along groove 28 when filters 24 and 26 are substantially completely clogged. After a rupture has occurred, the loud sound of gaseous flow escaping through the rupture will indicate to an operator that a replacement is required if he has not actually witnessed the rupture or if he is not in a position to view the bent portion of end cap 14. The 8-inch muffler embodiment described above presents a relatively small obstruction or restriction to air flow. The air flow obstruction of a muffler is determined by measuring the pressure drop across that muffler. An air flow of 100 cubic feet per minute undergoes a pressure drop of about 2 lbs./sq. in., and an air flow of 150 cu. ft./min. undergoes a pressure drop of 4 lbs./sq. in. The amount of noise reduction is dependent upon the frequency of the noise or sound source accompanying the gas flow. A 95 to 100 decibel noise level in the 1,000 cycle per second frequency range, which is the range to which the human ear is most sensitive, is reduced by the above described 8-inch muffler to approximately 60 decibels. A 95 to 100 decibel noise level in the 2,000 cycle per second frequency range is reduced to approximately 65 decibels. A 90 decibel noise level in the 500 cycle per second frequency range is reduced to slightly below 60 decibels. A 60 decibel noise level is a relatively low and clearly acceptable level. It is the level of ordinary conversation. The muffler of this invention is, therefore, an inexpensive and simple device that reduces the noise level of very loud and irritating noises to a completely acceptable level.

Having thus described one embodiment of the invention, a number of modifications will readily occur to those skilled in the art. Therefore, what is claimed is:

1. A noise muffler for reducing the noise level of a noise carrying gaseous discharge from a port, and having a unique safety valve comprising:
   a housing having a perforated portion providing an outlet path from said housing for gaseous flow and a solid portion impervious to gaseous flow;
   fitting means adapted to be attached to said port to provide a substantially airtight path between said port and the inside of said housing;
   a porous material having sufficient thickness and density to break up an acoustic wave and reduce the noise level of said gaseous discharge, said porous material being mounted within said housing in substantially airtight contact with said solid portion so that all gaseous flow from said port must pass through said porous material to reach said perforated portion, said porous material also being spaced from one area of said solid portion so that said gaseous flow from said port strikes said one area without passing through said porous material;

a groove formed on said one area of said solid housing portion for causing said solid housing portion to rupture along said groove in response to a predetermined pressure within said housing, said groove having a beginning and an end displaced a sufficient distance from said beginning so that the housing portions on opposite sides of said groove will be bent with respect to each other during said rupture, but so that no part of said housing will be broken off and propelled from said housing during said rupture.

2. The noise muffler of claim 1 in which:

said porous material comprises a depth type filter which reduces said noise level to a predetermined low level and which also coalesces and removes vapor contaminants from said gaseous flow; and the muffler includes a pleated paper filter mounted upstream from said depth type filter to remove solid contaminants from said gaseous flow, said removed contaminants being held by said depth type and said pleated paper filters to reduce the porosity of said filters to gaseous flow and thereby increase the pressure within said housing to ultimately cause said rupture.

3. The noise muffler of claim 2 in which said depth type filter and said pleated paper filter have sufficiently large cross-sectional areas to reduce said noise level to said predetermined low level without providing more than a predetermined small obstruction to gaseous flow.

* * * * *